(12) United States Patent
Lyon

(10) Patent No.: US 6,321,709 B1
(45) Date of Patent: Nov. 27, 2001

(54) FOOT ACTUATED STARTER & STABILIZER

(76) Inventor: Paul David Lyon, P.O. Box 712, Monroeville, AL (US) 36461

( * ) Notice: Subject to any disclaimer, the term of this patent is extended or adjusted under 35 U.S.C. 154(b) by 0 days.

(21) Appl. No.: 09/535,335

(22) Filed: Mar. 27, 2000

Related U.S. Application Data

(60) Provisional application No. 60/127,551, filed on Apr. 2, 1999.

(51) Int. Cl.[7] ....................................................... F02N 3/04
(52) U.S. Cl. ........................................................ 123/185.4
(58) Field of Search ................................. 74/6, 512, 140, 74/139; 123/185.2–185.4; 56/10.5; 37/243; D/14, 15

(56) References Cited

U.S. PATENT DOCUMENTS

| | | | | |
|---|---|---|---|---|
| D. 330,557 | * | 10/1992 | Smith | D15/17 |
| 2,850,003 | * | 9/1958 | Konle | 123/185.4 |
| 3,018,768 | * | 1/1962 | Thompson | 123/185.4 |
| 3,381,677 | * | 5/1968 | Hunter | 123/185.4 |
| 4,109,538 | * | 8/1978 | Glenday et al. | 74/6 |
| 4,397,274 | * | 8/1983 | Tarnedde | 123/185.4 |
| 5,070,828 | * | 12/1991 | Chestnutt | 123/185.4 |
| 5,133,312 | * | 7/1992 | Schede | 123/185.2 |
| 5,174,166 | * | 12/1992 | Tryon et al. | 74/6 |
| 5,253,540 | * | 10/1993 | Sanders et al. | 123/185.4 |
| 5,285,693 | * | 2/1994 | Sanders et al. | 123/185.2 |
| 5,630,388 | * | 5/1997 | Eaton | 123/185.4 |
| 5,762,037 | * | 6/1998 | Rothrock | 123/185.4 |

FOREIGN PATENT DOCUMENTS

2623517-A1 * 3/1978 (DE).
60-224957-A * 9/1985 (JP).

* cited by examiner

Primary Examiner—Henry C. Yuen
Assistant Examiner—Arnold Castro

(57) ABSTRACT

A foot actuated lawn mower stabilizing and starting device consisting of a beam structure extending from a lawn mower toward the operator's position where contacting the ground and a foot actuated lever structure supported by the beam structure. The attachment of the device to a lawn mower consists of a pivot such that the end of the device toward the operator may be pivoted up and stowed beneath the lawn mower handle when not in use. To stabilize and start the lawn mower, the device is lowered into contact with the ground. The device is actuated by a natural downward stepping motion of the operator's foot upon a pedal while standing upright and in the safe operating position with access to the operating and safety controls of the mower. Actuation produces significant vertical contact forces between the device and the ground, thus serving to stabilize the mower against movement while simultaneously producing horizontal pulling movement of the lever structure to which is connected the engine starter extension. The horizontal forces exerted by the lever structure upon the engine starter extension are equally and oppositely resisted by the beam structure, resulting in no net horizontal forces being applied to the mower when starting the engine by actuating this device.

9 Claims, 8 Drawing Sheets

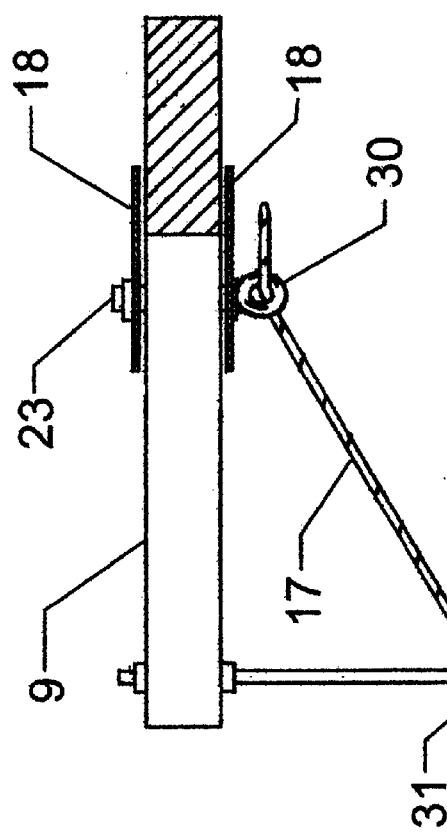
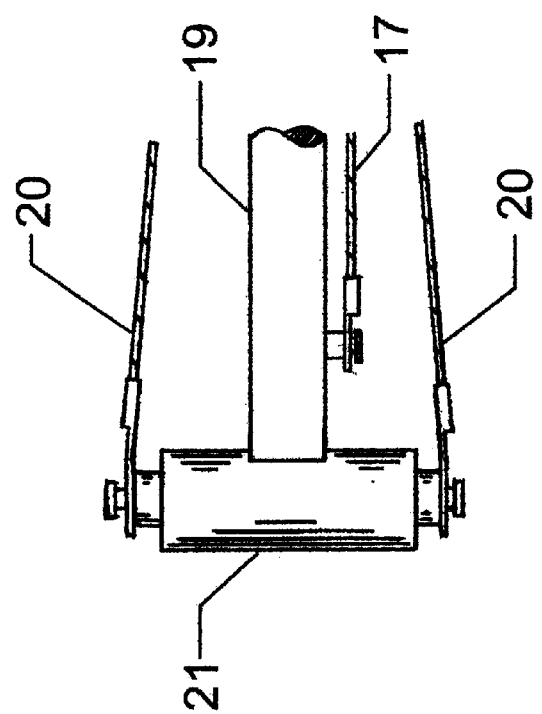
FIG. 8
FIG. 7

FOOT ACTUATED STARTER & STABILIZER

This application claims benefit of Prov. No. 60/127,551 filed Apr. 2. 1999.

BACKGROUND OF THE INVENTION

1. Field of the Invention

This invention relates to a foot actuated device for starting an engine and stabilizing the engine and machine incorporating such engine during the process of starting.

2. Description of Prior Art

Internal combustion engines are commonly used upon various types of portable or wheeled machines such as lawn mowers, snow blowers, garden tillers, cement mixers, generators, air compressors, etc.

Manual starting is commonly accomplished by the operator pulling a handle attached to a rope which under force withdraws a length of the rope from the starting mechanism which starts the engine. Such starting action commonly requires the operator to bend and reach for the starting handle and then withdraw the rope with a jerking motion which involves impact upon the handle gripping hand and wrist, excess rotation of the upper arm and shoulder socket with a twisting of the torso. The degree of force and range of motion thus required is beyond the capabilities of some persons, which are otherwise capable operators, particularly persons of slight build and/or strength and/or victims of muscle or joint disease or discomfort.

The pulling of such starting rope causes a force upon the engine and/or machine equal to the force applied by the operator to the rope handle. Where such force is not sufficiently resisted by the nature of construction of the machine, a motion or combination of motions of rolling, sliding, twisting and tipping of the machine will result in the general direction toward the operator as is commonly the case.

Machines of this nature generally involve dangerous moving parts and are intended for safe operation only when the operator is in an upright position, located a safe distance from the dangerous moving parts, in control of the machine and with access to the performance and safety controls of the machine which is often not the case during the starting action.

The foot actuated bracket as disclosed by U.S. Pat. No. 4,109,538 provides a post which contacts ground to resist downward foot force, but the embodiments do not include stabilization of the machine in the horizontal direction and such post is it's self subject to instability in such case as the post is not positioned exactly vertically or the foot force is not applied directly along the axis of the post; and in addition, the operator must be located in an awkward position for activation. The embodiment also requires the operator to use two hands in the operation of stowing the device after the engine is started which is not possible when applied to the mowers of modern construction which require one hand grasping the handle and fail safe engine stopping device at all times when the engine is running.

A later disclosure by U.S. Pat. No. 4,397,274 embodies a foot actuated starting lever attached to a lawn mower. The lever is attached directly to the body of the lawn mower which requires either the operator be positioned immediately adjacent to the lawn mower body with the handle and controls out of position (both of which are unsafe) or the lever extremity for foot engagement be extended to the-safe operating position. In either case the machine is unstable due to the downward foot force necessarily applied for starting overcoming the gravity forces acting on the machine and causing a rotation of the machine about a fulcrum point located at the machine's point of contact with ground nearest the operator, i.e., down force on the lever forces the machine to rotate and lift from the ground exposing the dangerous cutting blade. Horizontal stabilization of the machine is not embodied.

A lawn mower starting device as disclosed by U.S. Pat. No. 5,285,693 embodies an immobile, stationary device which requires electrical power for actuation.

SUMMARY OF THE INVENTION

It is, therefore, an object of this invention to provide a foot actuated starting device for a lawn mower with internal combustion engine and pull starter.

Another object of this invention is to provide a foot actuated starting device adaptable to other similar mobile or portable machines.

Another object of this invention is to provide a device which also stabilizes the machine it serves.

Another object of this invention is to provide such device which can be attached to or built as part of a machine.

Another object of this invention is to provide such device which is mobile as part of the machine it is built part of or attached to and transported in a stowed position.

Another object of this invention is to provide such device which is actuated by a natural downward stepping motion of the operator's foot while standing upright and in a safe operating position with access to the performance and safety controls of the machine.

Another object of this invention is to provide a collapsing and stowing mechanism which can be operated by use of one hand without over reaching and while the operator is standing upright in the safe operating position.

To these ends, according to this invention, there is provided a foot operated starting device comprising:

A generally horizontal beam structure attached near one end to the engine or other part of a lawn mower or similar machine and extended toward the operating position.

A lever structure, with pedal, attached to the beam structure providing means for engagement of the operator's foot and engagement of an extension of the machine's starting device.

An automatically collapsing lever/pedal structure.

A crank and securing mechanism which retracts and secures a rope attached to the device which is retracted and secured when stowing the device in a pivoted up position.

BRIEF DESCRIPTION OF THE DRAWINGS

FIG. 7 illustrates view 7 as referenced in FIG. 6.

FIG. 8 illustrates view 8 as referenced in FIG. 6.

DETAILED DESCRIPTION OF PREFERRED EMBODIMENTS

Figure 1:
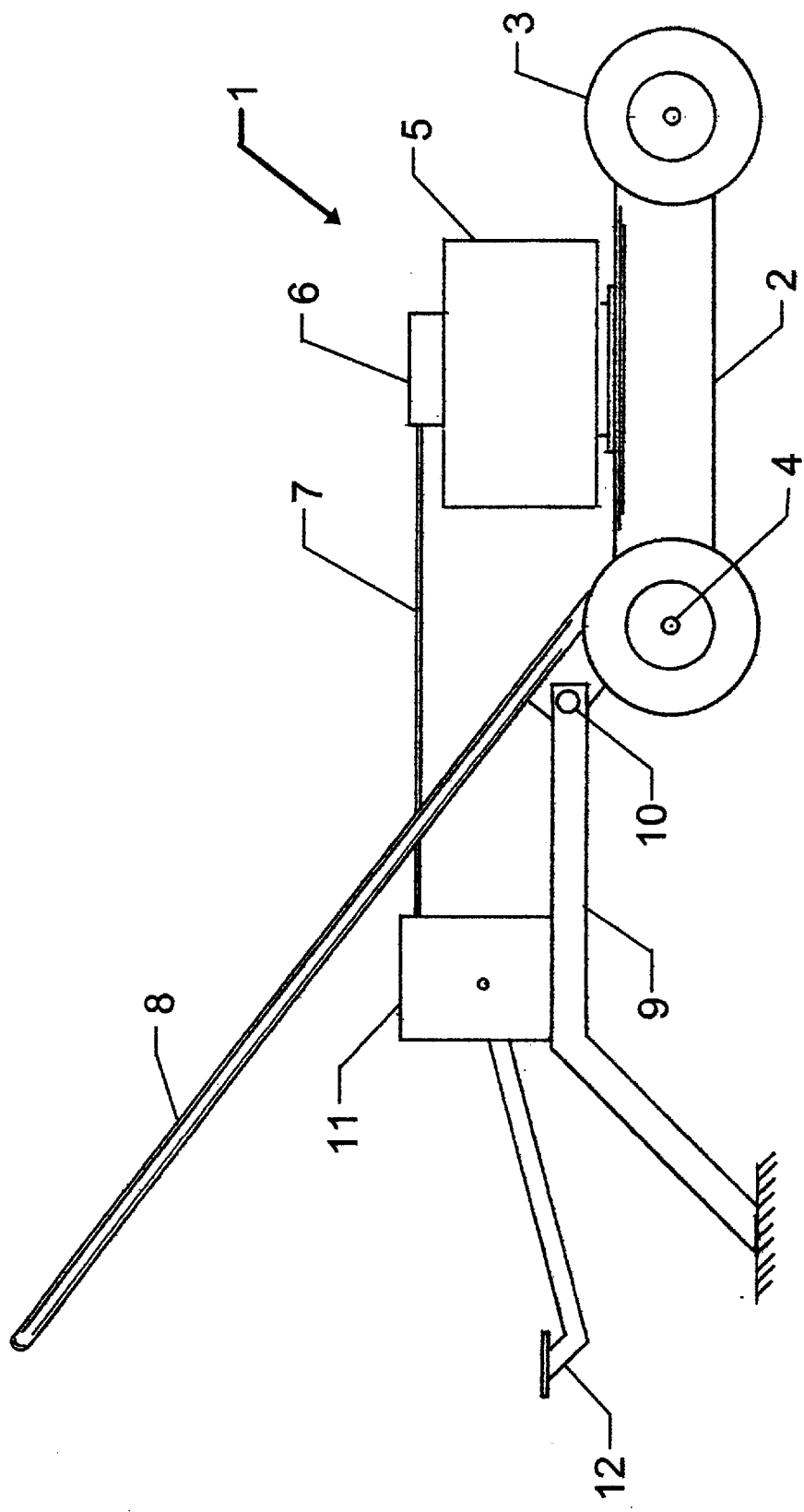
FIG. 1 is a side view elevation of one embodiment of the invention attached to a lawn mower and in general form.

A lawn mower of the general type, generally indicated by reference number 1. The mower generally comprises a main housing 2 mounted on wheels 3 which are rotated about their axles 4 when the mower is pushed and/or guided by the operator by means of a handle 8 and has a top mounted internal combustion engine 5. Typically, a handle 8 for a mower of this general type comprises a U shaped tubular member the ends of which are attached to the main housing 2 and extends upwardly and rearwardly from the housing 2. At the extremity of handle 8 is typically located the performance and safety controls for operation of the mower. The engine 5 is provided with a starting mechanism 6 which transforms externally applied force and motion which is supplied by action of the engine starting extension 7 by a pushing, pulling, rotating or other action thereof into crank shaft rotation thus starting the engine.

In the embodiment of the invention illustrated in FIG. 1, actuation of the engine starting extension 7 is provided by transmission 11 which is actuated by the operator forcing the pedal 12 downward which action is transformed by transmission 11 into actuation of the engine starting extension 7 as appropriate for starting of the engine. Transmission 11 with pedal 12 is supported by beam structure 9 in which one end is attached by vertical pivot 10 to the mower housing 2 and the opposite end is supported by the ground or supporting surface. The beam structure 9 and pedal 12 are extended toward the operators normal safe operating position with pedal 12 located for actuation from that position. The beam structure 9 transforms the downward forces of the operator's foot in actuation of pedal 12 into direct ground contact pressure serving to stabilize and immobilize the lawn mower while the operator's foot is actuating and/or applying pressure to the pedal 12. The actuation forces of transmission 11 upon engine starting extension 7 are equally and oppositely resisted through the beam structure 9 and attachment at pivot 10 to the mower housing 2, thus inducing no net mobilizing forces to the mower 1 or beam structure 9.

Figure 2:
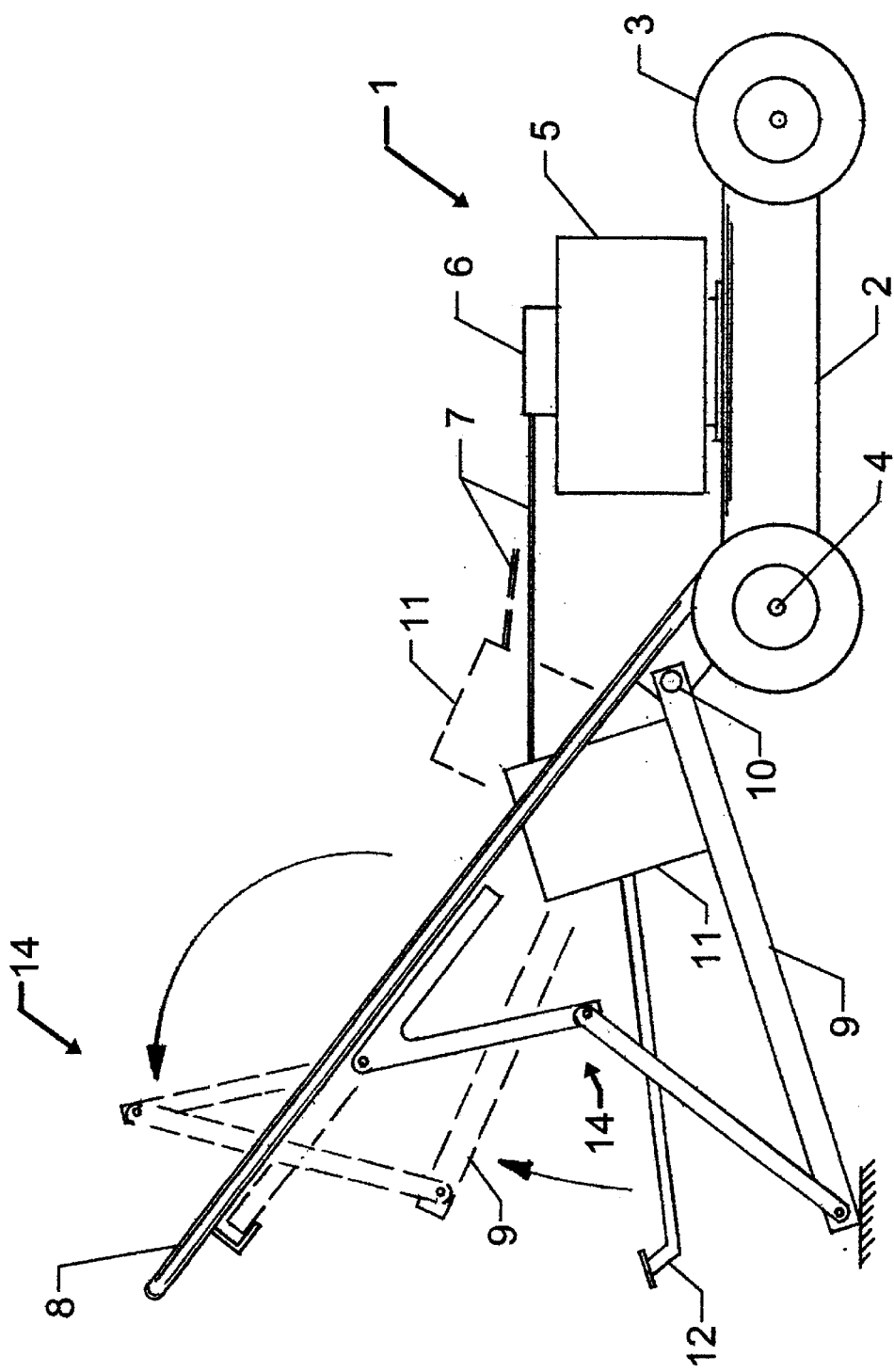
FIG. 2 is a side view elevation of another embodiment of the invention which is similar to FIG. 1 with the added feature of a stowing mechanism.

The embodiment of the invention illustrated in FIG. 2 includes all of the features embodied in FIG. 1, but with a different general shape of the beam structure 9 which has no effect upon purpose or function and with the addition of a stowing mechanism generally indicated by reference number 14 whereby beam structure 9 with transmission 11 and pedal 12 may be rotated about pivot 10 into the stowed position as shown when not in use.

Figure 3:
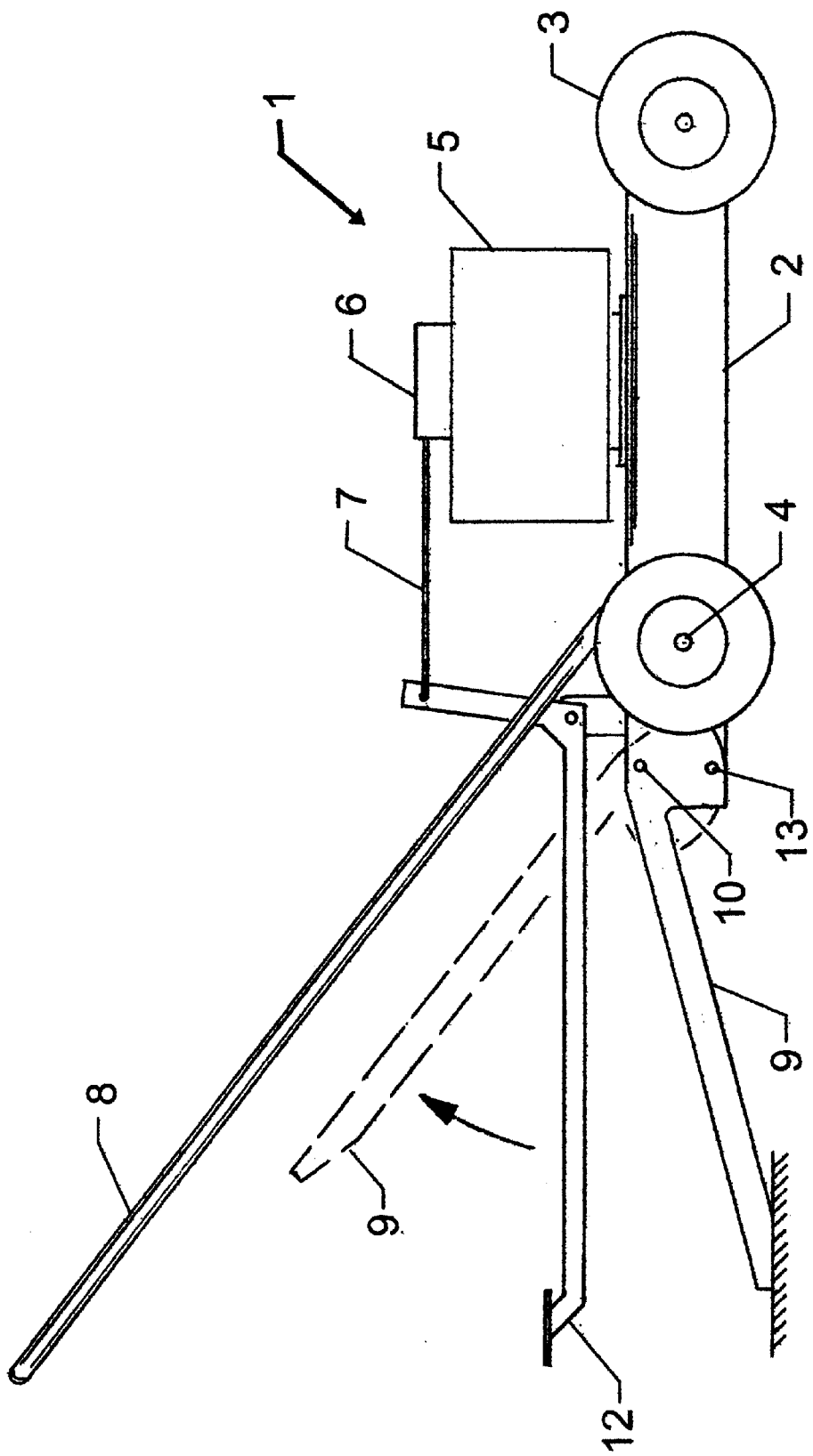
FIG. 3 is a side view elevation of another embodiment of the invention which provides similar function to FIG. 1 with different form and mechanism of function.

The embodiment of the invention illustrated in FIG. 3 comprises a lawn mower 1 with a foot actuated pedal 12 extended to the operator's normal safe operating position and beam structure 9 attached to the lawn mower housing 2 at pivot 10 is secured against pivoting when in use by pin 13 which passes through both the beam structure 9 and the mower housing 2. When not in use, the beam structure 9 may be pivoted upward to a stowed position upon withdrawal of pin 13 and pivoting about pivot 10. The vertical stroke of such a foot actuated pedal is limited by the physical capability of the operator with respect to the height of the pedal and the operator's ability to exert the downward force with the foot in the required position. Therefore, the pedal height and stroke are necessarily relatively small. The starting energy transmitted to the engine is proportional to the product of the force applied and the stroke over which the force is applied. Therefore, shorter stroke requires proportionally larger force to supply adequate starting energy. When actuating the pedal 12, an operator can easily apply a force up to the body weight of the operator which tends to rotate the mower 1 about the rear axle 4 with such rotation resisted by the weight of the lawn mower 1. Lawn mowers of this general type are light weight to facilitate maneuverability. The operator's body weight is necessarily much more than the weight of the lawn mower. With the point of foot pressure on pedal 12 being approximately three times as far from the point of rotation as the resisting weight of the mower, pedal force of only one third the weight of the mower causes rotation about the rear axle 4 with the front wheels rising above the ground and thus exposing the under side of the mower. With the beam structure 9 lowered into ground contact and secured against rotation about pivot 10 by insertion of pin 13 the downward force of the operator's foot upon the pedal 12 results in equal contact force between the beam structure 9 and the ground without tendency to rotate or destabilize the lawn mower 1 and in addition friction between the beam structure 9 and the ground under contact pressure serves to stabilize the lawn mower against horizontal movement.

The embodiment of the invention illustrated in FIGS. 4–10 inclusive comprise a lawn mower 1 in which the starting mechanism 6 is spring biased to retract a rope starting extension 7 which commonly is actuated by the operator's hand grasping the T shaped handle 27 and by rapid and forceful withdrawal of the rope starting extension 7 from the starting mechanism 6 thus starting the engine 5.

Figure 4:
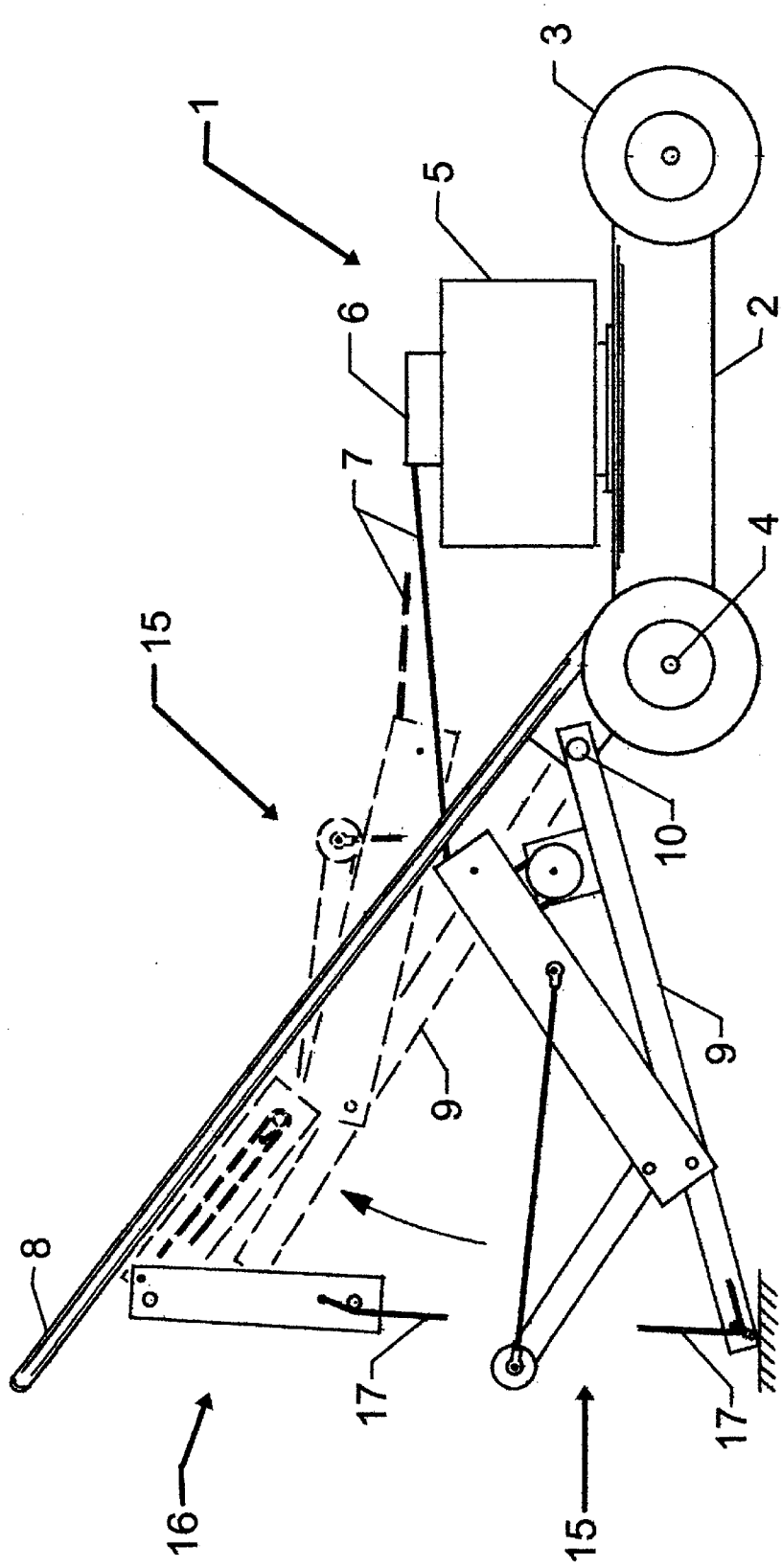
FIG. 4 is a side view elevation of another more detailed and complete embodiment of the invention with portions of the device referred to in general by reference numbers and illustrated in larger scale with more detail in subsequent Figures.
Figure 5:
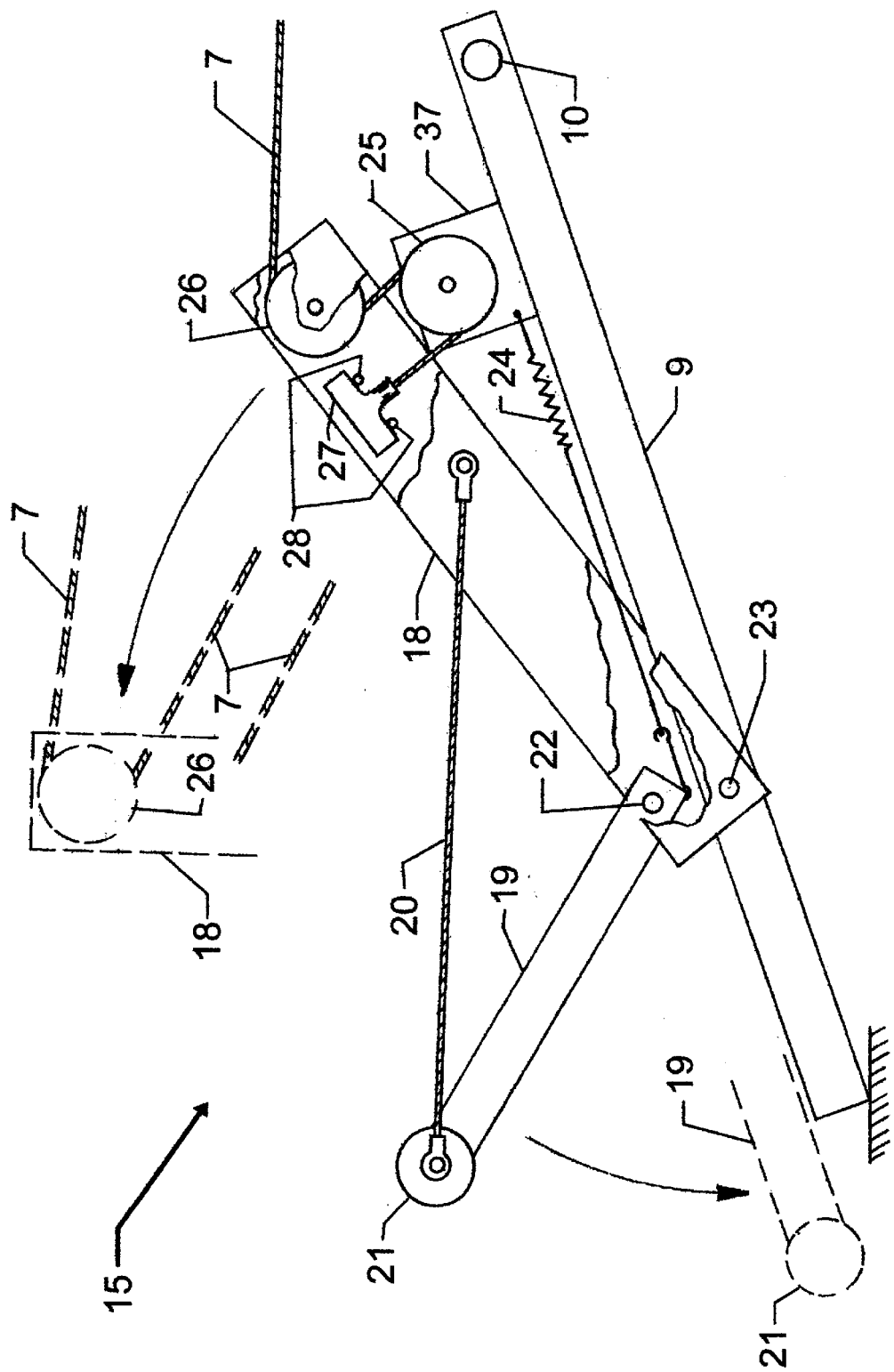
FIG. 5 is larger scale, partially sectionalized, side view elevation of the foot actuated starting device 15 as referenced in FIG. 4 including more details and illustrating the starting function.
Figure 6:
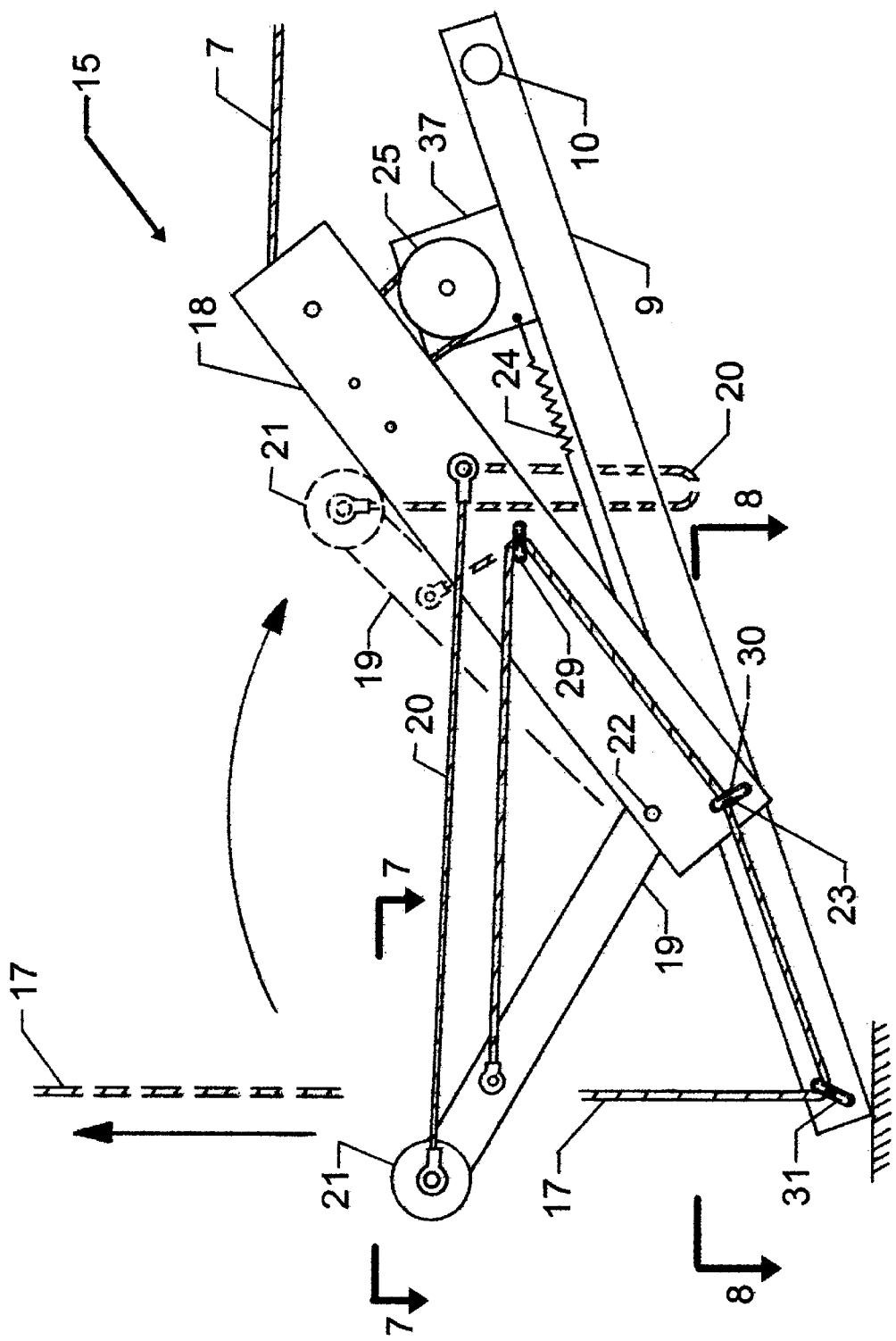
FIG. 6 is a larger scale side view elevation of the foot actuated starting device 15 as referenced in FIG. 4 which illustrates the automatic collapsing function of the mechanism.
Figure 10:
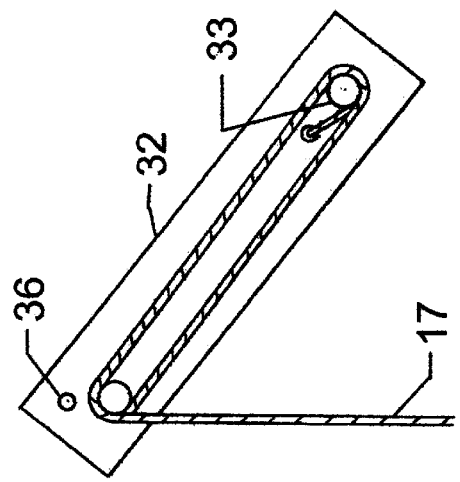
FIG. 10 is similar to FIG. 9 with further elaboration.
Figure 9:
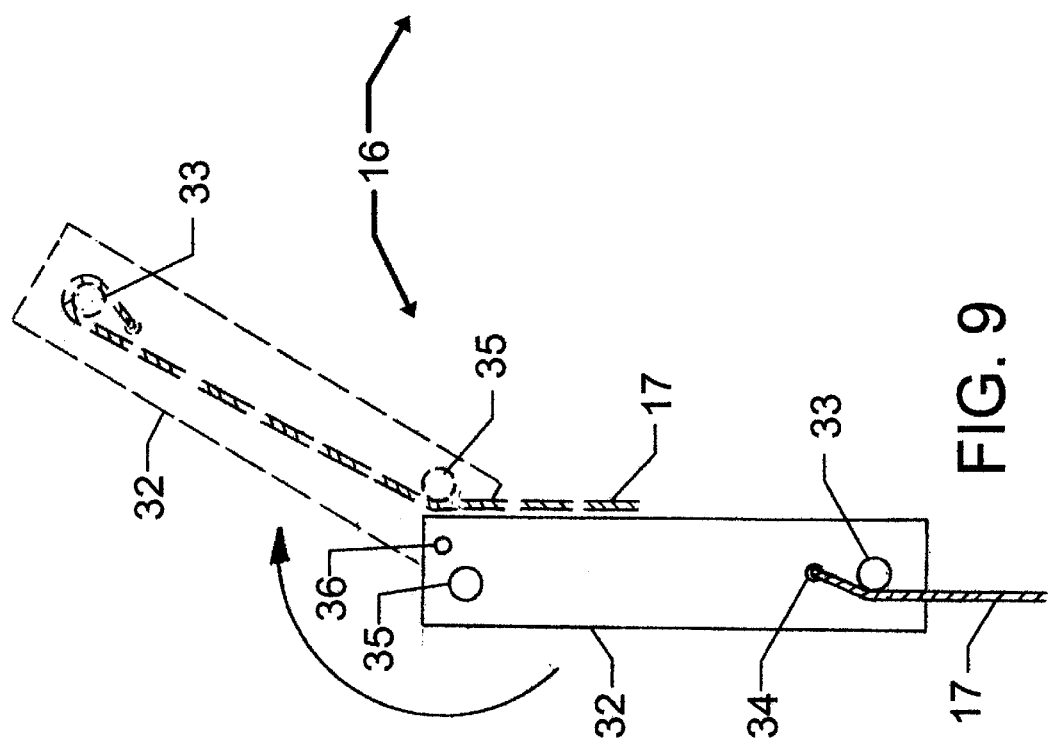
FIG. 9 is a larger scale side view elevation of the stowing crank 16 as referenced in FIG. 4 illustrating function and operation.

FIG. 4 illustrates the above described lawn mower in combination with a beam structure 9 with vertical pivot 10 and stowing rope 17, a foot actuated starting device, generally indicated by reference number 15 and illustrated in more detail in FIGS. 5,6,7&8, a stowing crank, generally indicated by reference number 16 and illustrated in more detail in FIGS. 9&10 and a collapsing mechanism for the foot actuated starting device 15 which is illustrated in FIGS. 6,7&8. The beam structure 9 and foot actuated starting device 15 are extended toward the operator's normal safe operating position for actuation by the operator while standing upright in that position and with access to the performance and safety controls of the lawn mower.

The foot actuated starting device, generally indicated by reference number 15 in FIG. 4, is comprised, as illustrated in FIG. 5, of a pulley arm 18 which is comprised of two matched members, one each side of and attached to the beam structure 9 at pivot 23, a retractable arm 19 attached to the pulley arm 18 by pivot 22, cable 20, pedal 21, spring 24 which provides bias for the retractable arm 19 toward the counter clockwise direction about it's pivot 22 and bias for the pulley arm 18 in the clockwise direction about it's pivot 23, pulley 25 with pulley bracket 37 which is attached to the beam structure 9, pulley 26, handle 27, handle securing pins 28. The beam structure 9 and attached foot actuated starting device 15 are attached to the lawn mower 1 at pivot 10 in position of alignment with the rope starting extension 7 in the vertical plane. The vertical angle of the rope starting extension 7 as well as the length of rope withdrawn from the engine starting mechanism 6 both before and after actuation are similar to those involved when actuating the starting handle 27 by hand as is commonly the case, thus modification or adaptation of the rope starting extension 7 and handle 27 is not necessary. The rope starting extension 7 is passed around pulley 26 and pulley 25 with handle 27 secured between pulley arms 18 by pins 28. Tension in the rope starting extension 7, provided by spring bias of the starting mechanism 6 adds to the bias provided by spring 24 thus securing arm 18 against pullet bracket 37 in the at rest position shown. The device is actuated by downward force of the operator's foot upon pedal 21 and generally downward movement to the moved position shown in FIG. 5. The downward movement of pedal 21 is accompanied by simultaneous rotation of arms 18 and their attachments about pivot 23 which are moved to the fully actuated position shown in FIG. 5. Actuation thus increasing the length of rope starting extension 7 between the starting mechanism 6 and pulley 26, pulley 26 and pulley 25 and between pulley 25 and handle 27, whereupon rope starting extension 7 is extracted from starting mechanism 6 with sufficient force, stroke and velocity as required to start the engine 5. The downward force of the operator's foot upon pedal 21 before, during and after actuation of the device, is resisted by equal contact force between the beam structure 9 and the ground which contact force produces horizontal frictional resistance to motion of the beam structure 9 and the mower 1. From the fully actuated position and upon release of the operator's foot pressure upon pedal 21, the device returns to the at rest position by means of tension in the rope starting extension 7 in combination with bias to that position by action of spring 24.

FIG. 6 illustrates the automatic collapsing of the foot actuated starting device 15 which occurs immediately prior to rotation about pivot 10 in an upward direction into the stowed position. Stowing rope 17 is threaded through eye 31, eye 30 which is located at pivot 23, eye 29 and attached to retractable arm 19. Collapsing is initiated by upward force and motion applied to the stowing rope 17 which force is less than that which causes rotation about pivot 10 which rotation is resisted by the weight of the device. Upon further upward motion of stowing rope 17, retractable arm 19 is rotated about pivot 22 into the retracted position shown in FIG. 6 and restrained against further rotation about pivot 22 by contact between pedal 21 and arms 18. With retractable arm 19 restrained against further rotation about pivot 22, continued upward movement of stowing rope 17 lifts beam structure 9 by means of eye 31 causing rotation about pivot 10 into the stowed position illustrated in FIG. 4.

View 7 illustrates the relative position of parts attached to retractable arm 19.

View 8 illustrates the relative position of beam structure 9, eye 30 & 31 and stowing rope 17.

FIGS. 9 & 10 illustrate a stowing crank, generally indicated by reference number 16, comprised of crank lever 32, pivot 36, pin 33, pin 35 and stowing rope attachment hole 34. Stowing rope 17 is passed through hole 34 and secured in position when knotted on the back side of crank lever 32. To actuate the stowing crank, the operator's hand grasps pin 33 and thereby rotates crank lever 32 about pivot 36 into the moved position illustrated in FIG. 9. With the crank lever rotated into the moved position indicated in FIG. 9, tension in stowing rope 17 and gravity force of the crank lever bias crank lever 32 clockwise about pivot 36. At such moved position, the operator may release pin 33, thus allowing crank lever 32 to return to near it's original position under influence of bias, thus eliminating over reach by the operator at such time as the mower engine is running. With the crank lever 32 having rotated clockwise about pivot 36 through one rotation, the operator again grasps pin 33 and again thereby rotates the crank lever 32 about pivot 36 into the moved position indicated in FIG. 9 and again may release pin 33 from this position. At this point, stowing rope 17 is supporting the full weight as imparted by the device and the tension in stowing rope 17 is the dominant bias causing clockwise rotation of crank lever 32 about pivot 36 until the position of equilibrium is reached as illustrated in FIG. 10 in which case pin 35 and downward extension of stowing rope 17 are located vertically below pivot 36 with crank lever 32 angled in a safe and convenient position. In the process of reversing the above stowing crank operation, it is assumed that the lawn mower engine is not running, whereas, if such were not the case, the device should not be lowered from the stowed position. To reverse the stowing crank operation, the operator may over reach from the normal operating position or stand along side the mower handle 18 and grasp pin 33 in the position shown in FIG. 10 thereby rotating crank lever 32 counter clockwise about pivot 36. In the reverse operation, the operator must exert only slight upward force through the upward movements of pin 33 when rotated about pivot 36 and the previously discussed bias forces will force the downward movements.

What is claimed is:

1. A device comprised of a generally horizontal beam structure, which is attached near one end to the engine or other part of a machine, which is powered by an internal combustion engine, which is started by an operator's downward foot action upon a foot actuated starting device, in which, said beam structure transfers downward forces, caused by an operators foot against said foot actuated starting device, to the ground or supporting surface of the machine by contact pressure upon the ground or supporting surface of the machine with said contact pressure providing resistance to said downward forces and resistance to tipping of said machine and said contact pressure providing horizontal frictional resistance against said beam structure, which resists horizontal movement of said beam structure and said machine, attached thereto.

2. A device according to claim 1, in which, said foot actuated starting device is comprised of a lever structure pivotably attached to said beam structure, positioned within the length of the beam structure, with the body of the lever structure working generally in the vertical plane with and above the beam structure with the lever structure being angular, of "bell crank" configuration, such that when rotated about it's pivot, generally vertical movement at one extremity of the structure is accompanied by generally horizontal movement of another extremity of the structure with the generally vertically moving extremity of the lever structure having means to be engaged by an operator's foot and the generally horizontally moving extremity of the lever structure having means to engage a rope extension of a pull starting provision of the engine.

3. A device according to claim 2, in which, said means to engage a rope extension of a pull starting provision of the engine consists of at least one pulley, attached to said generally horizontally moving extremity of the lever structure, in which, said rope extension of the pull starting provision of the engine is passed around at least one said pulley and terminated with attachment to said beam structure or, alternatively, terminated with attachment to said machine.

4. A device according to claim 3, in which, said means to engage a rope extension of a pull starting provision of the engine consists of at least one additional pulley, which is attached to said beam structure or, alternatively, attached to said machine, in which, the rope extension of a pull starting provision of the engine is passed around at least one said pulley of claim 4 and around at least one additional said pulley and terminated with attachment to said horizontally moving extremity of said lever structure.

5. A device according to claim 2 for a machine having a handle frame that extends angularly upwardly relative to the engine and ground toward the operators position with beam structure of said device pivotably attached to the machine generally below said handle frame, extending toward the operators position, in which, said beam structure can be rotated down into ground contacting position when in use for starting the machine and rotated up into a stowed position where supported by the machine or machine handle when not in use for starting the machine.

6. A device according to claim 5, in which, said lever structure is collapsable into a compact space when not in use.

7. A device according to claim 5 with a lifting and securing mechanism comprised in combination,
   a. a crank located in a vertical plane near and outside the upper handle frame of the machine,
   b. a rope attached to the crank lever and extending downward with extremity attached to said device,
   c. a pin on said crank lever projecting horizontally and located near and off center of the crank lever pivot axis and vertically below the crank lever pivot axis when said crank is in the stowed position, in which, rope tension applied to said pin secures said crank in the stowed position,
   d. a pin on said crank lever projecting horizontally and located at extremity opposite the crank lever pivot axis such that when the crank lever is rotated, the rope wraps or unwraps around the pins at opposite ends of the crank lever causing the rope to extend or retract.

8. A device according to claim 6 in which the said collapsible lever structure is biased toward both the uncollapsed configuration and the deactuated position by spring and/or gravity force.

9. A device according to claim 8, in which, a rope is attached to said collapsible lever structure and threaded through eyes positioned on the device such that upward force upon the rope extremity extending from an eye positioned toward the operator end of the device will first overcome the spring and gravity bias acting to hold said lever structure in the uncollapsed position, thus first collapsing said lever structure and then upon further upward force and movement of said rope extremity, lift and rotate said device into the stowed position.

* * * * *